United States Patent [19]

Ito

[11] Patent Number: 5,023,633
[45] Date of Patent: Jun. 11, 1991

[54] ELECTROSTATIC PRINTER USING CONTINUOUS PAPER
[75] Inventor: Toyozo Ito, Iwate, Japan
[73] Assignee: Kabushiki Kaisha Sato, Japan
[21] Appl. No.: 450,217
[22] Filed: Dec. 13, 1989
[30] Foreign Application Priority Data
Dec. 23, 1988 [JP] Japan .................... 63-323429
[51] Int. Cl.⁵ .................... G01D 15/14; G01D 15/34
[52] U.S. Cl. .................... 346/160; 346/136
[58] Field of Search .................... 346/136, 138, 160
[56] References Cited
U.S. PATENT DOCUMENTS
4,410,584 10/1983 Toba et al. .................... 346/138 X
4,663,638 5/1987 Hirose .................... 346/136

Primary Examiner—George H. Miller, Jr.
Attorney, Agent, or Firm—Ostrolenk, Faber, Gerb & Soffen

[57] ABSTRACT

A continuous-paper electrostatic printer saves paper by avoiding needless feeding of paper to the electrostatic printing section when there is no data to be printed. This is accomplished by providing a paper cutting means downstream of the paper holder of the printer and ensuring that paper is not transported upstream of the cutting means to the printer when there is no data to be printed and by ejecting the section of cut paper from the printer system at the same time.

9 Claims, 2 Drawing Sheets

ELECTROSTATIC PRINTER USING CONTINUOUS PAPER

BACKGROUND OF THE INVENTION

This invention relates to an electrostatic printer that uses continuous paper as the printing medium.

The paper cutting means in electrostatic printers that use continuous, rolled up paper is conventionally disposed either directly after a paper transport means located between the paper holder and the electrostatic printing section, or directly after the electrostatic printing section. Therefore, even after the paper has been cut, in the event of a malfunction of the paper transport means, the paper continues to be fed to the electrostatic printing section. This wastes paper and tends to scorch the paper at the electrostatic printing section.

SUMMARY OF THE INVENTION

It is, therefore, an object of the present invention to provide a continuous-paper electrostatic printer that is capable of preventing paper waste due to needless feeding thereof. Such unnecessary feeding of papers arises, for example, in cases where a set of print data A is to be printed on a specific number of labels located on the continuous paper and then followed by the printing of a set of print data B on a specific number of labels in a manner whereby the second set of print data B is being input while the first print data A is being printed. In this case, it is possible for the printing of the print data A to be completed prior to the completion of the inputting of the print data B, resulting in wasteful feeding of paper while the print data B is still being inputted.

In accordance with the present invention, wastage of paper is avoided by an electrostatic printer that uses continuous paper and which comprises: a continuous-paper holder; an electrostatic printing section; a continuous-paper transport means disposed between the continuous-paper holder and the electrostatic printing section for feeding paper from the continuous-paper holder to the electrostatic printing section; a paper ejection means provided on the downstream side of the electrostatic printing section in the direction of paper travel, for ejecting paper; and a paper cutting means disposed between the continuous-paper holder and the paper transport means.

In the printer of the present invention, when a set time period elapses after completion of printing of one prescribed set of print data and before the next set of print data is ready, the cutting means located just downstream of the paper holder is activated to cut the paper. The transport means located between the cutting means and the electrostatic printing section is disabled so that transportation of the paper upstream of the cutting means is then halted. The section of the cut paper extending from the cutting means to the electrostatic printing section is thereafter ejected by the ejection means located on the downstream side of the electrostatic printing section.

Other features and advantages of the present invention will become apparent from the following description of the invention which refers to the accompanying drawings.

DETAILED DESCRIPTION OF THE PREFERRED EMBODIMENTS

Figure 1:
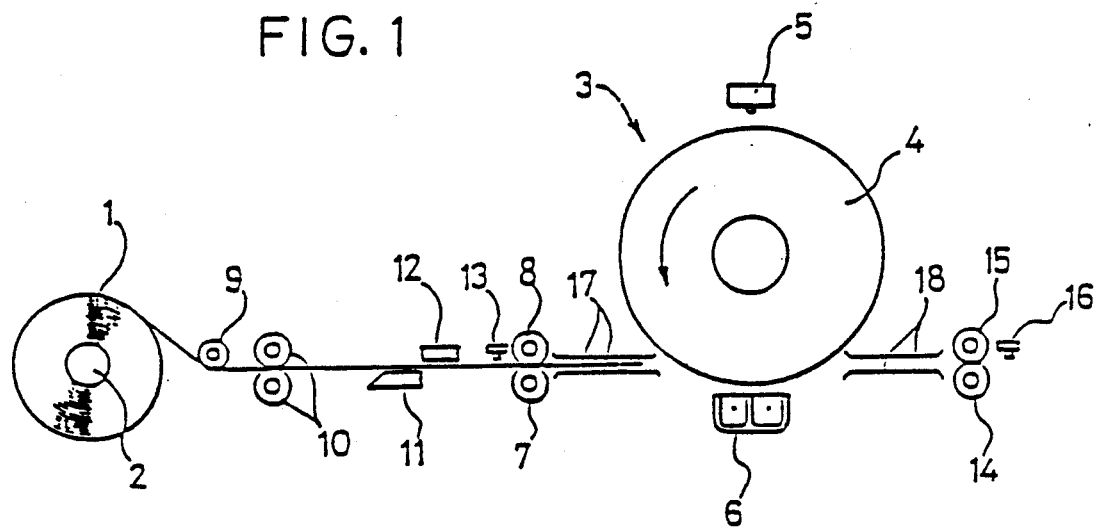
FIG. 1 is a general schematic view of a first embodiment of the continuous-paper electrostatic printer of the present invention.

Referring to FIG. 1, a roll of paper 1 consists of a backing sheet coated with a separating agent and has a plurality of labels of the same size, each of which is coated with an adhesive and is detachably adhered to the backing sheet continuously along the length of the backing sheet at a desired pitch. The roll of paper 1 is rotatably mounted on a reel 2 that constitutes a continuous-paper holder. An electrostatic printing section 3 is located at a prescribed distance from the paper holder. The main constituents of the electrostatic printing section 3 are a light-sensitive drum 4, a LED head 5 and an electrostatic transfer element 6.

A drive roller 7 and a pressure roller 8 form a transport means for the paper 1, the rollers 7 and 8 being located between the paper holder and the electrostatic printing section 3. The paper 1 is guided by guide rollers 9 and 10 and is cut when needed by a cutting means constituted of a fixed blade 11 and a movable blade 12. The blades 11 and 12 are located between the paper holder and the transport means. There is located, on the paper holder side of the transport means, a paper-ready sensor 13 that detects whether or not the paper 1 is positioned ready for being transported. However, the paper-ready sensor 13 may instead be provided on the electrostatic printing section 3 side of the transport means.

An ejection means for ejecting the paper 1 is formed by an ejection drive roller 14 and an ejection pressure roller 15, which rollers 14 and 15 are located on the downstream side of the electrostatic printing section 3. Downstream of the ejection means 14 and 15 is an ejection sensor 16 that detects whether the cut paper 1 has left the electrostatic printing section 3. Guide plates 17 and 18 provided upstream and downstream, respectively, of the electrostatic printing section 3 guide the paper to and from the printing section 3.

Figure 2:
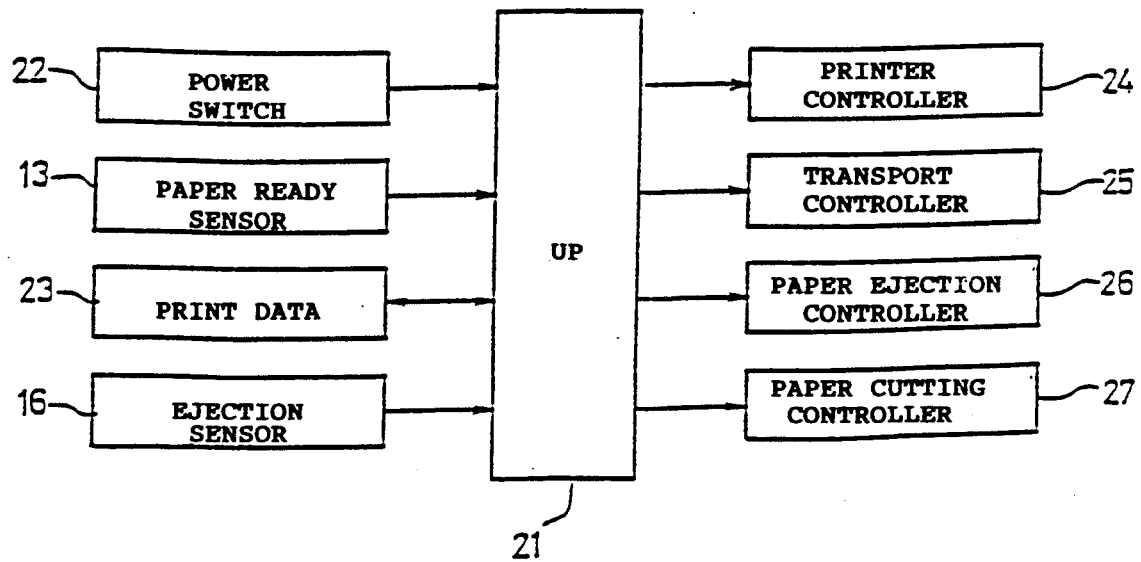
FIG. 2 is a block diagram of a control means of the invention.

FIG. 2 is a block diagram of the operational means of the continuous paper electrostatic printer of the present invention. A microprocessor 21 receives inputs from a power switch 22, the paper-ready sensor 13, the ejection sensor 16, and data from a print data block 23. Output ports of the microprocessor 21 send control/data information to printer controller 24 which controls activation and deactivation of the light-sensitive drum 4, LED head 5 and electrostatic transfer element 6; to a transport controller 25 which controls activation and deactivation of the transport drive roller 7; to a paper ejection controller 26 which controls activation and deactivation of the ejection drive roller 14; and to a paper cutting controller 27 which controls activation and deactivation of the movable blade 12.

Figure 3:
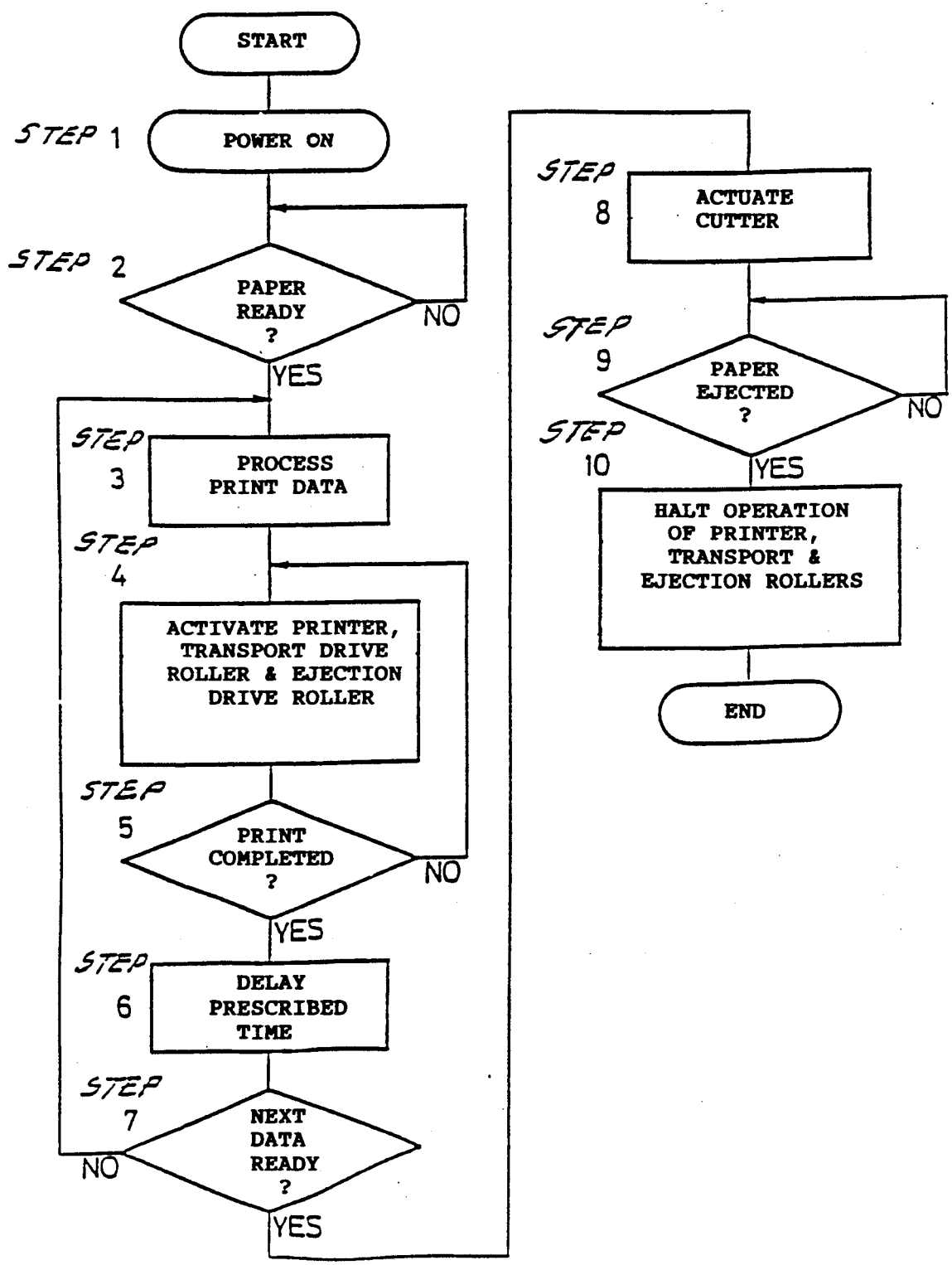
FIG. 3 is a flow chart illustrating the operation of the invention.

The continuous paper electrostatic printer operates in accordance with a program stored in a ROM in the microprocessor 21. This program, which operates in accordance with the flow chart of FIG. 3, will now be described.

After the power switch 22 is switched on in step 1, it is determined in step 2 whether the paper 1 is ready to be transported, by noting the state of the paper-ready sensor 13. If the paper 1 is not ready, the leading edge thereof is fed to the rollers 7 and 8, either manually or, if provided, by an autoloading mechanism.

If the answer in step 2 is Yes, i.e., the paper is ready, the process moves on to step 3, where print data which has been previously inputted is processed. Print data comprises, for example, price information to be printed on price tags, parcel address information, or the like. In a typical situation, it may be required to print 100 labels with print data A, and 50 labels with print data B.

Upon completing processing of the print data, the program proceeds to step 4 where the transport controller 25, printer controller 24, and paper ejection controller 26 are operated to activate transport drive roller 7, the electrostatic printing section 3, and the ejection drove roller 14 to, respectively, guide, imprint information on and then eject the paper 1.

The electrostatic printing section 3 is operated by rotating the light-sensitive drum 4, energizing and de-energizing the LED head 5, and activating the electrostatic transfer element 6. The LED head 5 is energized and de-energized in accordance with line oriented print data information. The position at which the printing of each label is to start can be controlled, for example, by signals outputted by position sensors (not shown), on the basis of detecting spaces between the labels which are adhered to the backing sheet.

In step 5 it is determined whether printing on labels of a first set of print data has been completed, e.g. print data A. If there is more of the set of print data A to be printed, the process goes back to step 4. Otherwise, the process moves on to step 6 and a prescribed supervisory time delay period (3 seconds, for example) is set.

In step 7, it is determined if inputting of the next print data set has not been completed within the prescribed time period. If the answer is No, indicating that inputting of the next set of data has been completed, the process goes back to step 3.

It is preferred that the various control operations of step 4 be suspended for the duration of the supervisory time period of step 6.

If the next print data has not been readied within the supervisory time period, the process moves on to step 8 where the paper cutting controller 27 is commanded to operate the movable blade 12 to cut the paper 1.

Next, in step 9, it is determined whether the trailing edge of the cut paper 1 has passed a laser light source (not shown), and that it is, therefore, no longer disposed opposite the ejection sensor 16. If the answer is Yes, the program moves on to step 10 where the overall operation of the system is halted by stopping the printer section 3, transport drive roller 7 and ejection drive roller 14.

The transport drive roller 7 continues to be driven from the end of the supervisory time period (step 6) until the trailing edge of the cut paper passes the position of the ejection sensor 16. However, since the paper has been severed from the roll of paper 1 on the paper holder, no more paper will be transported to the printer section 3.

The light-sensitive drum 4, transport drive roller 7 and ejection drive roller 14 may be operated from the same power source.

Although the foregoing embodiment has been described with reference to continuous paper consisting of a backing sheet to which labels are detachably adhered, the present invention is not so limited. Ordinary continuous paper may be used instead. Also, instead of LED light, a laser beam may be used to form the image on the light-sensitive drum 4 of the electrostatic printing section 3.

The continuous-paper electrostatic printer in accordance with the present invention thus comprises: a paper holder; an electrostatic printing section; a continuous paper transport means provided between the paper holder and the electrostatic printing section for feeding paper from the paper holder to the electrostatic printing section; paper ejection means provided on the downstream side of the electrostatic printing section in the direction of paper travel, for ejecting paper; and paper cutting means between the paper holder and the paper transport means.

When a predetermined time period set for the electrostatic printer ends, after completion of printing of one prescribed set of printing data but before a next set of print data and conditions have been readied, the cutting means located just downstream of the paper holder is activated to cut the paper. Transportation of the paper upstream of the cutting means by the transport means located between the cutting means and the electrostatic printing section is halted, and the section of the cut paper extending from the cutting means to the electrostatic printing section is ejected by the ejection means located on the downstream side of the electrostatic printing section.

The electrostatic printer of the present invention therefore does not waste paper by needlessly feeding the paper to the electrostatic printing section when there is no data to be printed. Thus, paper accumulation and scorching thereof at the electrostatic printing section is avoided.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A printer, comprising:
   a paper holder;
   a printing section including an electrostatic printing head for imprinting information on continuous paper;
   a paper transport means disposed between the paper holder and the printing section for transporting the continuous paper from the paper holder to the printing section;
   paper ejection means, disposed at a downstream side of the printing section, relative to the direction of paper travel, for ejecting paper; and,
   paper cutting means for cutting the paper, the paper cutting means disposed between the paper holder and the paper transport means.

2. The printer of claim 1, wherein the paper cutting means comprises a fixed blade and a movable blade.

3. The printer of claim 2, further comprising guide rollers for guiding the paper to the printing section.

4. The printing of claim 3, further comprising guide plates disposed upstream and downstream of the printing section for guiding the paper respectively to and from the printing section.

5. The printer of claim 1, further comprising a controller system for the printer.

6. The printer of claim 5, wherein the controller system comprises a microprocessor, and coupled to the microprocessor, a printer controller for controlling the printing section, a transport controller for controlling the paper transport means, a paper ejection controller for controlling the paper ejection means, and a paper cutting controller for controlling the paper cutting means.

7. The printer of claim 5, wherein the controller system comprises a microprocessor and a control program effective for handling a plurality of sets of print data to be imprinted on labels.

8. The printer of claim 7, the control program further comprising means for setting a prescribed time delay in printer processing at the conclusion of the printing of a first set of print data.

9. A method for printing information on labels, the method comprising:

providing a paper holder, a printing section including an electrostatic printing head for imprinting information on continuous paper, a paper transport means disposed between the paper holder and the printing section for transporting paper from the paper holder to the printing section, paper ejection means, disposed at a downstream side of the printing section for ejecting paper, and paper cutting means disposed between the paper holder and the paper transport means;

setting a predetermined time period for delaying operation of the printing section after completion of the printing of a prescribed first set of print data; halting transporting of the paper from the paper holder during said time period;

determining whether a second set of data has been readied; and cutting and ejecting a portion of the paper which has been cut and which extends from the cutting means to the printing section, in the event that the second set of data has not been readied.

* * * * *